(12) United States Patent
Lonjon et al.

(10) Patent No.: US 10,535,445 B2
(45) Date of Patent: Jan. 14, 2020

(54) METHOD FOR PREPARING AN ELECTRICALLY CONDUCTIVE STRATIFIED COMPOSITE STRUCTURE

(71) Applicants: CENTRE NATIONAL DE LA RECHERCHE SCIENTIFIQUE, Paris (FR); UNIVERSITE TOULOUSE III—PAUL SABATIER, Toulouse (FR)

(72) Inventors: Antoine Lonjon, Toulouse (FR); Eric Dantras, Toulouse (FR); Colette Lacabanne, Toulouse (FR)

(73) Assignees: CENTRE NATIONAL DE LA RECHERCHE SCIENTIFIQUE, Paris (FR); UNIVERSITE TOULOUSE III—PAUL SABATIER, Toulouse (FR)

( * ) Notice: Subject to any disclaimer, the term of this patent is extended or adjusted under 35 U.S.C. 154(b) by 77 days.

(21) Appl. No.: 15/327,566

(22) PCT Filed: Jul. 20, 2015

(86) PCT No.: PCT/FR2015/051991
§ 371 (c)(1),
(2) Date: Jan. 19, 2017

(87) PCT Pub. No.: WO2016/012708
PCT Pub. Date: Jan. 28, 2016

(65) Prior Publication Data
US 2017/0154703 A1    Jun. 1, 2017

(30) Foreign Application Priority Data

Jul. 21, 2014 (FR) .................................... 14 57020

(51) Int. Cl.
*H01B 1/24* (2006.01)
*B29C 70/58* (2006.01)
(Continued)

(52) U.S. Cl.
CPC ............... *H01B 1/24* (2013.01); *B29B 11/16* (2013.01); *B29C 70/025* (2013.01); *B29C 70/58* (2013.01);
(Continued)

(58) Field of Classification Search
None
See application file for complete search history.

(56) References Cited

U.S. PATENT DOCUMENTS

| 9,447,253 B2 * | 9/2016 | Weiss ...................... B29C 41/12 |
| 2007/0125493 A1 * | 6/2007 | Jang ...................... B29C 43/222 |
| | | 156/324 |

(Continued)

FOREIGN PATENT DOCUMENTS

| EP | 1380617 | 1/2004 |
| FR | 2985744 | 7/2013 |

(Continued)

OTHER PUBLICATIONS

Search Report dated Dec. 11, 2015.
Search Report dated Jun. 4, 2015.

*Primary Examiner* — Jeffrey D Washville
(74) *Attorney, Agent, or Firm* — IPSilon USA, LLP (57) ABSTRACT

The invention relates to a process for preparing an electrically conductive composite film, in particular in the form of a self-supported film or of a prepreg, comprising at least one thermoplastic polymer resin and electrically conductive particles chosen from a) graphene, carbon nanotubes, carbon nanofibres, and mixtures thereof; and b) filiform metal nanoparticles; to a process for preparing an electrically conductive laminated composite structure comprising such an electrically conductive composite film; to said electrically conductive composite film, to said electrically conductive laminated composite structure, and also to the uses thereof.

11 Claims, 2 Drawing Sheets

(51) Int. Cl.

| | | |
|---|---|---|
| *B29C 70/88* | (2006.01) | |
| *B29B 11/16* | (2006.01) | |
| *B29C 70/02* | (2006.01) | |
| *B29K 71/00* | (2006.01) | |
| *B29K 105/16* | (2006.01) | |
| *B29K 505/14* | (2006.01) | |
| *B29K 507/04* | (2006.01) | |

(52) U.S. Cl.
CPC ........ *B29C 70/882* (2013.01); *B29K 2071/00* (2013.01); *B29K 2105/162* (2013.01); *B29K 2505/14* (2013.01); *B29K 2507/04* (2013.01); *B29K 2995/0005* (2013.01)

(56) References Cited

U.S. PATENT DOCUMENTS

| | | | |
|---|---|---|---|
| 2011/0140580 A1 | 6/2011 | Yang et al. | |
| 2012/0267563 A1 | 10/2012 | Capsal et al. | |
| 2013/0309423 A1* | 11/2013 | Roger | ................. H01B 1/04 |
| | | | 428/1.4 |

FOREIGN PATENT DOCUMENTS

| | | |
|---|---|---|
| WO | 2009064133 | 5/2009 |
| WO | 2014011293 | 1/2014 |

\* cited by examiner

METHOD FOR PREPARING AN ELECTRICALLY CONDUCTIVE STRATIFIED COMPOSITE STRUCTURE

RELATED APPLICATIONS

This application is a National Phase Application of PCT/FR2015/051991 filed on Jul. 20, 2015, which in turn claims the benefit of priority from French Patent Application FR 14 57020 filed on Jul. 21, 2014, the entirety of which are incorporated herein by reference.

BACKGROUND

Field of the Invention

The invention relates to a process for preparing an electrically conductive composite film, in particular in the form of a self-supported film or of a prepreg, to a process for preparing an electrically conductive laminated composite structure comprising such an electrically conductive composite film, to said electrically conductive composite film, to said electrically conductive laminated composite structure, and also to the uses thereof.

Description of Related Art

The present invention applies typically, but not exclusively, to the motor vehicle, railroad, aeronautical, aerospace (e.g. electronic satellites), computer and electronics fields, in which electrically conductive composite parts, and in particular electrically conductive laminated composite structures, are used as a replacement for solid metal parts.

Indeed, by virtue of their low weight, their low production cost and their adjustable mechanical properties (adjustable in particular in terms of flexibility), these composite parts are increasingly used for manufacturing, for example, support parts or vehicle structures (chassis, plates, etc.). Added to this are other advantages compared with solid metal structures, such as better fatigue resistance and the absence of corrosion.

However, these composite parts must be sufficiently conductive (e.g. conductivities greater than 0.1 S/m) to be able to replace metal parts. By way of example, in the aeronautical field, they must be capable of discharging electric charge and avoiding structural damage associated with lightning. Indeed, the impact of lightning on one or more composite parts of an aircraft can lead to a degradation of its structure, but also a dysfunction thereof (overvoltage within the electrical systems, spark erosion and degassing at the level of the fittings, spark erosion at the edges of composite parts, critical effects in the fuel areas).

There are numerous methods for manufacturing laminated composite structures and they are carried out either using dry fibres (e.g. fibres alone) and a polymer resin in film form or in liquid form, or using prepregs. The most common methods are bag moulding in an autoclave (i.e. roller pressing), compression moulding, resin transfer moulding (RTM), and resin film infusion (RFI) and liquid resin infusion (LRI).

Laminated composite structures are most commonly manufactured from thermosetting polymer resins (e.g. epoxide, phenolic, vinyl ester, polyester, polyimide, etc., resins). Indeed, these resins are generally in solution in the form of a non-crosslinked polymer in suspension in a solvent. Once the crosslinking has been carried out, these structures are resistant to solvents and can be easily handled. However, these laminated composite structures have the disadvantage of having low impact resistance. Moreover, once the polymerization of the thermosetting polymer resin has been carried out, the laminated composite structures are no longer transformable, thereby preventing their recycling and/or the repair of certain defects that have appeared during the manufacture thereof.

Thus, attention is turned to the specific use of thermoplastic polymer resins [e.g. polyethersulphones (PESs), polyetherimides (PEIs), polyether ether ketones (PEEKs), or polyphenylene sulphides (PPSs)] which have better impact resistance and possible reforming after melting. By way of example, Grouve et al. [*Plastics, Rubber and Composites,* 2010, 39, 3-5, 208-215] have described the preparation of a laminated composite structure of [PPS/glass fibres]$_n$ type by stacking unitary stacks comprising successive layers of continuous glass fibres and of PPS films, separated by tinned steel or aluminium plates or polytetrafluoroethylene (PTFE) sheets, by hot-pressing the stack formed, and then cooling. However, the structure obtained is not sufficiently conductive (e.g. conductivities less than 0.1 S/m).

Cytec Technology Corp. has developed a PEEK/carbon fibre prepreg (sold under the reference APC-2/AS4) in the form of a unidirectional (UD) tape containing approximately 60% by volume of carbon fibres. A unidirectional tape (sometimes called ribbon) consists of carbon fibres parallel to one another, oriented in a single direction. The cohesion between the carbon fibres is provided by the PEEK. Laminated composite structures can then be obtained by stacking these UD tapes in various directions, and then consolidation through the effect of temperature and sometimes pressure. In order to make the laminated composite structure sufficiently conductive, a metal grid (e.g. of copper or aluminium) is incorporated into said structure. However, it is then necessary to add an insulating material, such as a fold of glass fibres, in order to prevent galvanic corrosion associated with the contact between the carbon fibres and the metal grid.

Cytec Technology Corp. also proposes, in international application WO 2013/032620, preparing a laminated composite structure by stacking prepregs on which can be deposited metal sheets, roves, flocks, fibres or particles of a metal material chosen from aluminium, copper, titanium, nickel and stainless steel, in order to improve the electrical conductivity of the structure. However, it is not specified how these metal elements are deposited. In addition, when these metal elements do not have an aspect ratio, they must be introduced in amounts of greater than 15% by volume, causing a degradation of the mechanical properties of the laminated composite structure.

The deposition of metal particles is generally carried out by chemical vapour deposition (i.e. CVD), by physical vapour deposition (i.e. PVD) or chemical deposition via an aqueous route. However, these deposition techniques require sophisticated and expensive equipment and/or the adhesion of the metal layer to the prepreg is not sufficient for the abovementioned applications.

Finally, Boyer et al. [Reports of the JNC, Poitiers 2011, "*Comportement mécanique et électrique d'un composite PEEK/fibres de carbone/nanotubes de carbone*" ["Mechanical and electrical behaviour of a PEEK/carbon fibre/carbon nanotube composite"]] have described a laminated composite structure comprising successive layers of PEEK/carbon fibre prepregs and of PEEK/carbon nanotube (CNT) composite films. The presence of the layers of PEEK/CNT composite film make it possible to improve the transverse electrical conductivity of the structure (i.e. the electrical conductivity in the direction of its thickness or in the direction perpendicular to the carbon fibres). The composite film is prepared by hot-extrusion of a mixture of PEEK and CNT using a twin-screw extruder so as to form granules, and by forming of the granules under a hot press. Indeed, the methods of mixing and/or of forming a mixture of a thermoplastic polymer resin with conductive particles that are generally used to manufacture a composite in the form of a film or of a pellet use the thermoplastic polymer resin in the molten state and thus require the use of very high temperatures (300 to 400° C.). However, these methods, such as extrusion, injection moulding, hot-moulding or hot-pressing create high production costs, and they are not suitable, in particular when the conductive particles have a high aspect ratio (e.g. carbon nanotubes, carbon fibres). This is because the mixing by extrusion causes shear forces which break said particles and reduce their aspect ratio, and thus the final conductivity of the composite, and the forming under press, by injection moulding or by extrusion orients the conductive particles with a high aspect ratio in the direction of the material, thereby decreasing the uniform dispersion of said particles in the composite, and thus its final conductivity. In addition, the increase in the volume content of conductive particles in order to improve the conductivity degrades the mechanical properties of the structure.

Objects and Summary

Thus, all of the existing techniques provide laminated composite structures which do not have the mechanical and/or electrical properties sufficient to be used in the abovementioned fields of application.

Thus, the aim of the present invention is to overcome the drawbacks of the abovementioned prior art and to provide a process for preparing an electrically conductive composite film based on thermoplastic polymer resin and on electrically conductive particles, said process being a process that is economical and easy to carry out, that can be used with any type of thermoplastic polymer resin and that makes it possible to preserve good mechanical properties.

In addition, another aim of the present invention is to develop a process for preparing an electrically conductive laminated composite structure based on thermoplastic polymer resin, on electrically conductive particles and on long or continuous fibres, said process being a process that is economical and easy to carry out, that can be used with any type of thermoplastic polymer resin and that makes it possible to preserve good mechanical properties.

Finally, the other aims of the invention are to provide an electrically conductive composite film based on thermoplastic polymer resin and on electrically conductive particles with a high aspect ratio, and also an electrically conductive laminated composite structure based on thermoplastic polymer resin, on electrically conductive particles with a high aspect ratio and on long or continuous fibres, having an electrical conductivity that is sufficient for it to be possible for them to be used in the abovementioned leading applications.

These aims are achieved by virtue of the invention that will now be described hereinafter.

A first subject of the invention is thus a process for preparing an electrically conductive composite film comprising at least one thermoplastic polymer resin and electrically conductive particles chosen from:
 a) graphene, carbon nanotubes, carbon nanofibres, and mixtures thereof; and
 b) filiform metal nanoparticles,
said electrically conductive composite film optionally impregnating fibres,
said process being characterized in that it comprises at least the following steps:
 1) a step of preparing a suspension comprising a solvent and electrically conductive particles chosen from:
  a) graphene, carbon nanotubes, carbon nanofibres, and mixtures thereof; and
  b) filiform metal nanoparticles,
 said suspension comprising approximately from 0.06% to 0.5% by volume of said electrically conductive particles relative to the total volume of the suspension,
 2) a step of mixing a powder of thermoplastic polymer resin, having a particle size of less than or equal to approximately 50 µm, with the suspension prepared in the preceding step so as to obtain a homogeneous suspension, said homogeneous suspension comprising approximately from 7% to 20% by volume of said thermoplastic polymer resin relative to the total volume of the suspension,
 3) a step of depositing the homogeneous suspension of the preceding step on a non-stick or fibrous support,
 4) a drying step,
 5) a step of heat treatment at a temperature greater than or equal to the melting point of the thermoplastic polymer resin when said resin is in semi-crystalline form, or greater than or equal to its glass transition temperature when said resin is in amorphous form, in order to obtain an electrically conductive composite film deposited on said non-stick support or impregnating said fibrous support, and
 6) a step of removing the electrically conductive composite film from the support when the support is a non-stick support.

In the present invention, the expression "electrically conductive particles chosen from: a) graphene, carbon nanotubes, carbon nanofibres, and mixtures thereof; and b) filiform metal nanoparticles" signifies that the electrically conductive particles are chosen from graphene, carbon nanotubes, carbon nanofibres, a mixture of two types of abovementioned particles, a mixture of the three types of abovementioned particles and filiform metal nanoparticles.

Depending on the nature of the support used in step 3), the process of the invention may result in an electrically conductive composite film in the form of a self-supported electrically conductive composite film or in the form of an electrically conductive composite prepreg.

In other words, when the support is a non-stick support, the process of the invention comprises step 6) and the latter makes it possible to produce a self-supported electrically conductive composite film comprising at least one thermoplastic polymer resin and approximately from 1% to 10% by volume of electrically conductive particles relative to the total volume of the electrically conductive composite film.

In the present invention, the expression "non-stick support" signifies a support of which the function is to limit the adhesion of the electrically conductive composite film on said support in order to facilitate the separation and the removal of said electrically conductive composite film from the non-stick support during step 6) of the process of the invention.

In one particular embodiment, the self-supported electrically conductive composite film comprises approximately from 1% to 5% by volume of electrically conductive particles, and preferably approximately from 2% to 4% by volume of electrically conductive particles, relative to the total volume of said self-supported electrically conductive composite film. The use of these small amounts of electrically conductive particles makes it possible to produce a self-supported, weakly charged, electrically conductive composite film, while at the same time preserving its mechanical properties.

It should be noted that the use of an amount of electrically conductive particles of greater than 10% by volume in the self-supported electrically conductive composite film can result in degradation of its mechanical properties.

When the support is a fibrous support, step 6) of the process of the invention is not present and step 5) makes it possible to directly produce an electrically conductive composite film impregnating said fibrous support (i.e. the fibres of said fibrous support). An electrically conductive composite prepreg comprising at least one thermoplastic polymer resin, approximately from 1% to 10% by volume of electrically conductive particles and approximately from 10% to 70% by volume of fibres, relative to the total volume of the electrically conductive composite prepreg, is thus obtained.

In one particular embodiment, the electrically conductive composite prepreg comprises approximately from 1% to 5% by volume of electrically conductive particles and approximately from 10% to 70% by volume of fibres, relative to the total volume of the electrically conductive composite prepreg, and preferably approximately from 2% to 4% by volume of electrically conductive particles and approximately from 10% to 70% by volume of fibres, relative to the total volume of said electrically conductive composite prepreg. The use of these small amounts of electrically conductive particles makes it possible to produce a weakly charged, electrically conductive composite prepreg, while at the same time preserving its mechanical properties.

It should be noted that the use of an amount of electrically conductive particles of greater than 10% by volume in the electrically conductive composite prepreg can result in degradation of its mechanical properties.

Thus, the process of the invention makes it possible to obtain, in few steps, an electrically conductive composite film (in the form of a self-supported film or of a prepreg) based on thermoplastic polymer resin and on electrically conductive particles, while at the same time avoiding processes such as those described in the prior art which implement at least one step of mixing a thermoplastic polymer resin in the molten state with electrically conductive particles. Moreover, the process of the invention avoids any forming step that would result in degradation of its volume conduction or transverse conduction properties, such as extrusion, hot-pressing or injection moulding.

In the present invention, the expression "suspension" means a dispersion of an insoluble (or virtually insoluble) and finely divided solid (powder) in a liquid medium. It is thus a heterogeneous system consisting of a liquid (solvent) external continuous phase and a solid internal phase.

The solvent of step 1) can be chosen from hydrocarbon-based solvents such as alkanes, alkenes, toluene or xylene, oxygen-bearing solvents such as alcohols, ketones, acids, esters, dimethylformamide (DMF) or dimethyl sulphoxide (DMSO), chlorinated solvents, water, and mixtures thereof.

The solvent of step 1) is preferably a solvent that can be easily evaporated, in order to facilitate the drying of step 4).

The solvent of step 1) that is particularly preferred is an alcohol such as ethanol.

The solvent of step 1) must be inert with respect to the electrically conductive particles and to the thermoplastic polymer resin.

In one particular embodiment, the graphene is in the form of particles of which the average size varies from approximately 2 to approximately 100 nm.

The carbon nanotubes are in particular an allotropic form of carbon belonging to the fullerene family. More particularly, the carbon nanotubes are sheets of graphene rolled up on themselves and closed at their end by hemispheres similar to fullerenes.

In the present invention, the carbon nanotubes comprise single wall carbon nanotubes (SWNTs) comprising a single sheet of graphene and multiwall carbon nanotubes (MWNTs) comprising several sheets of graphene fitted into each other like Russian dolls, or else a single sheet of graphene rolled up on itself several times.

In one particular embodiment, the carbon nanotubes have an average diameter ranging approximately from 1 to 50 nm.

The carbon nanotubes can have a length ranging approximately from 1 to 10 µm.

The carbon nanofibres (or carbon fibrils) are composed of graphite zones which are more or less organized (turbostratic stacks) and the planes of which are inclined at variable angles relative to the axis of the fibre. These stacks can take the form of wafers, fish bones or of dishes stacked to form structures having an average diameter generally ranging approximately from 100 nm to 500 nm, or more.

The carbon nanofibres can have a length ranging approximately from 1 to 10 µm.

The metal of said filiform metal nanoparticles may be a stainless metal, that is to say a metal which does not react with the oxygen from the air to form a "passivation" layer.

According to one preferred embodiment of the invention, the metal is chosen from silver, gold, platinum and a mixture of two or three of said metals.

The metal that is particularly advantageous is silver.

In the present invention, the expression "filiform nanoparticles" signifies particles having:
  a length $(L_1)$, extending along a principle direction of elongation,
  two dimensions $(D_1)$ and $(D_2)$ referred to as orthogonal dimensions, extending along two transverse directions that are orthogonal to one another and orthogonal to said principle direction of elongation, said orthogonal dimensions $(D_1, D_2)$ being smaller than said length $(L_1)$ and less than 500 nm, and
  two ratios $(F_1)$ and $(F_2)$, referred to as aspect ratios, between said length $(L_1)$ and each of the two orthogonal dimensions $(D_1)$ and $(D_2)$, said aspect ratios $(F_1, F_2)$ being greater than 50.

The expression "aspect ratio" signifies the ratio between the length $(L_1)$ of a filiform nanoparticle, and one of the two orthogonal dimensions $(D_1, D_2)$ of said filiform nanoparticle.

According to a preferred embodiment, the two orthogonal dimensions $(D_1, D_2)$ of a filiform nanoparticle are the diameter (D) of its transverse cross section. It is then referred to as a "nanorod" or "nanowire".

A filiform nanoparticle may also be a "ribbon" in which the two orthogonal dimensions of the filiform nanoparticle according to the invention are its width $(L_2)$ (first orthogonal dimension) and its thickness (E) (second orthogonal dimension).

More particularly, filiform metal nanoparticles according to the invention are advantageously characterized by at least one of the following features:
  the two orthogonal dimensions $(D_1, D_2)$ of the filiform nanoparticles are between approximately 50 nm and 250 nm, and preferably between 100 nm and 200 nm;
  the length $(L_1)$ is between approximately 1 µm and 150 µm, and preferably between approximately 25 µm and 70 µm;

the aspect ratios ($F_1$, $F_2$) are between approximately 100 and 200, and preferably about approximately 150.

According to one particular embodiment of the invention, the electrically conductive particles have an aspect ratio greater than or equal to 50, and preferably greater than or equal to 100. Such electrically conductive particles are chosen from:

a') carbon nanotubes, carbon nanofibres, and mixtures thereof; and b') filiform metal nanoparticles.

The filiform metal nanoparticles are most particularly preferred.

This is because the inventors of the present application have discovered that the use of volume amounts ranging approximately from 1% to 10% of filiform metal nanoparticles makes it possible to obtain a sufficiently conductive composite film, whereas at least 15% to 20% by volume of metal particles in the form of spherical particles, flocks or powder are required in order to be able to obtain an equivalent conductivity. However, with such volume proportions, degradation of the mechanical properties is observed.

The filiform metal nanoparticles of the invention have two features which are essential for the production of weakly charged, electrically conductive composite films. Their aspect ratio is high (between 50 and 200), thereby making it possible to achieve percolation thresholds for low amounts of conductive charge. Furthermore, since these filiform nanoparticles are metal, they have the intrinsic conductivity of the metal of which they are formed.

The suspension of step 1) may also comprise metal particles that are different from the filiform metal nanoparticles.

The metal of these metal particles has the same definition as the metal of the filiform metal nanoparticles.

The metal of these metal particles is preferably identical to the metal of the filiform metal nanoparticles.

Said metal particles may be in the form of nanometric and/or micrometric spherical metal particles, of powder or of flocks.

According to one preferred embodiment, the suspension of step 1) does not comprise any pigment and/or dye. This is because the pigments (e.g. inorganic fillers) and/or dyes generally used can impair the mechanical properties of the conductive film.

Step 1) may be carried out using mechanical stirring and/or ultrasound, in particular at a frequency ranging approximately from 20 kHz to 170 kHz, and at a power that can range approximately from 5 W to 500 W per pulse of 5 seconds.

The thermoplastic resin of step 2) can be chosen from polyaryl ether ketones (PAEKs) such as polyether ether ketones (PEEKs), polyether ketone ketones (PEKKs), polyether ether ketone ketones (PEEKKs), polyether ketones (PEKs) or polyether ketone ether ketone ketones (PEKEKKs); polyphenylene sulphides (PPSs); polyetherimides (PEIs); polyethersulphones (PESs); polysulphones (PSs); polyamides (PAs) such as nylon; polyimides (PIs); polyamide-imides (PAIs); polycarbonates (PCs); polyvinylidene fluorides (PVdFs); copolymers of polyvinylidene fluoride and of trifluoroethylene [P(VdF-TrFE)] or of hexafluoropropene [P(VdF-HFP)]; and mixtures thereof.

The thermoplastic resin of step 2) is preferably chosen from polyether ether ketones (PEEKs), polyether ketone ketones (PEKKs), polyphenylene sulphides (PPSs) and polyamides (PAs).

The thermoplastic resin of step 2) is preferably a non-ionic thermoplastic resin.

This is because ionic conductive polymers have very poor mechanical properties and do not make it possible to produce structural composites. They are always used on a support and in applications that do not require mechanical stress.

In other words, the thermoplastic resin of step 2) preferably does not comprise ionic groups of sulphonate (e.g. Nafion®), carboxylate, phosphonate or sulphonimide type.

The suspension prepared in step 2) can have a viscosity ranging approximately from 1 Pa·s to 33 Pa·s, and preferably ranging approximately from 1 Pa·s to 10 Pa·s at 25° C. Unless otherwise indicated, the viscosity values given in the present application, and in particular the viscosity value of the suspension, have been determined at 25° C., at a shear frequency of 0.5 rad·s$^{-1}$ and measured using a rotary rheometer sold under the trade name ARES by the company Rheometric Scientific, equipped with a Couette cell. The rheological measurement time corresponding to a deformation ranging from 0 to 30% is approximately 300 seconds.

The viscosity of the suspension of step 2) must be sufficient to be able to form a conductive film with a homogeneous thickness, and it must not be too high to be able to produce a conductive film.

During step 2), the viscosity of the suspension can be adjusted by adding an appropriate amount of a solvent identical to that used during step 1).

The suspension of step 2) preferably comprises approximately from 7% to 12% by volume of thermoplastic polymer resin relative to the total volume of the suspension.

In the suspension of step 2), the ratio of the weight of solvent to the weight of total solids (i.e. weight of thermoplastic polymer resin+weight of electrically conductive particles) can range approximately from 0.5 to 8, and preferably approximately from 0.5 to 4.

The thermoplastic resin used in step 2) is not soluble in the solvent of step 1).

A particle size thereof that is less than or equal to approximately 50 μm is required if it is desired to obtain a homogeneous dispersion of said resin in the film, in particular when the film has a thickness of about 100 μm.

It preferably has a particle size of less than or equal to approximately 30 μm, and more preferably of less than or equal to approximately 20 μm.

Step 2) can be carried out using mechanical stirring and/or ultrasound, in particular at a frequency ranging approximately from 20 kHz to 170 kHz, and at a power that can range approximately from 5 W to 500 W per pulse of 5 seconds.

This step 2) makes it possible to avoid the use of methods for melt-mixing of the thermoplastic polymer resin with the electrically conductive particles, such as those described in the prior art. This is because, as explained above, these methods (e.g. extrusion, injection moulding, hot-moulding, hot-pressing, etc.) use the thermoplastic polymer resin in the molten state and create high production costs, and also degradation of the electrical properties of the electrically conductive particles.

According to one preferred embodiment of the invention, the suspension of step 2) consists solely of the thermoplastic polymer resin, the solvent and the electrically conductive particles.

According to a first variant of the invention, the depositing of step 3) can be carried out according to the following sub-steps:

3a) a step of introducing the homogeneous suspension of step 2) into a container comprising an injection nozzle in its lower part, and maintaining the suspension under mechanical stirring, 3b) a step of applying the suspension to a non-stick or fibrous support, using said injection nozzle and a scraper (e.g. flexible steel blade) located at the nozzle outlet.

According to this first variant, step 3b) makes it possible to form a layer of suspension deposited on the non-stick or fibrous support.

The height of the scraper can be adjusted relative to the support in order to form a more or less thick layer of suspension deposited on said support.

The layer of suspension may be in the form of a layer of finite dimension or of a continuous layer.

In order to form a continuous layer of suspension, steps 3a) and 3b) can be carried out simultaneously.

In addition, step 3b) can be carried out using a roll which makes it possible to cause the support to continuously file past the injection nozzle and under the scraper, at a given speed.

When the support is a fibrous support, the layer of suspension gradually impregnates said fibrous support.

According to this first variant of the invention, the suspension of step 3a) has a viscosity preferably ranging approximately from 1 Pa·s to 10 Pa·s.

The non-stick support may be a sheet of polyimide such as, for example, that sold under the reference Upilex®, or a sheet of metal that has been made non-stick by a suitable treatment, in particular using a demoulding agent such as, for example, that sold under the reference Cirex Si041WB® by Sicomin.

The fibrous support is a support comprising long or continuous fibres.

In the invention, the expression "long fibres" signifies fibres of at least approximately 1 mm in length.

The fibres of the fibrous support are preferably continuous.

The fibres can be chosen from carbon fibres, glass fibres and aramid fibres. Carbon fibres are preferred.

The fibres can be in the following forms: linear (threads, roves) or surface fabrics (fabrics, mats).

A fabric is made up of the interlacing of warp threads and weft threads. A fabric is balanced if the weight of warp is equal to the weight of weft. It is called unidirectional (i.e. UD) if the weight of warp represents more than 70% of the total weight.

By way of example, webs (called ribbons in certain cases) consist of fibres that are parallel to one another, oriented in a single direction. The transverse cohesion is provided either by an adhesive ribbon placed according to a predetermined step, or by light weaving; a unidirectional fabric is then obtained, in which the weight of fibres in the warp direction represents 98% of the total weight and the remaining 2% provide the transverse cohesion.

The most common fabrics are:
- plain weaves (or cloth) in which the warp and weft threads interlace alternatively;
- satin: the warp thread floats above several weft threads; by way of example, in a 5-satin, the warp thread floats above 4 weft threads;
- twill in which the warp thread floats above one or more weft threads and then passes below one or more weft threads; the difference with satin comes from the shift in the weaving points between two consecutive roves which never touch one another for satin.

The fabrics are easier to handle than the webs and offer advantageous properties in two directions.

The fibre mats are made with assemblies of threads of which the lengths are generally about 50 mm.

According to this first variant, the fibrous support is preferably a fibre fabric, a unidirectional alignment of fibres or a fibre mat.

According to a second variant of the invention, the depositing can be carried out according to the following sub-steps:

3a') a step of introducing the homogeneous suspension of step 2) into a container and maintaining it under mechanical stirring, 3b') a step of immersing a fibrous support in the suspension.

This second variant makes it possible to form a fibrous support impregnated with said suspension.

According to this second variant of the invention, the suspension step 3a') has a viscosity preferably ranging approximately from 5 Pa·s to 10 Pa·s.

The fibrous support is as defined previously.

According to this second variant, the fibrous support is preferably unidirectional.

The drying time and temperature used during step 4) are adjusted to the nature of the suspension of step 2) (i.e. type of thermoplastic polymer resin, of solvent, etc.).

The drying makes it possible to evaporate off the solvent of step 1).

It can be carried out in an oven, in particular at a temperature ranging approximately from 25° C. to 180° C.

Step 4) can last approximately from 15 min to 15 h, and preferably approximately from 15 min to 1 h.

Step 4) makes it possible in particular to produce a thin film of agglomerated powder in which the electrically conductive particles are entangled in the powder of thermoplastic polymer resin. This agglomerated powder comprises a homogeneous mixture of powders of electrically conductive particles and of thermoplastic polymer resin. It then no longer comprises solvent. This powder can impregnate the support when said support is fibrous.

Step 5) can be carried out at a temperature ranging approximately from 200° C. to 400° C.

This step 5) can be carried out in a conventional oven or an infrared oven.

Step 5) can last approximately from 5 min to 1 hour, and preferably approximately from 5 to 15 min.

Without this step 5) of heat treatment at a temperature greater than or equal to the melting point of the thermoplastic polymer resin when said resin is in semi-crystalline form or greater than or equal to its glass transition temperature when said resin is in amorphous form, melting is not achieved and only a sedimented layer of electrically conductive particles and of thermoplastic polymer resin in powder form is obtained, resulting in a layer of a material which crumbles and which cannot therefore be used to manufacture laminated composite structures.

Step 6) can be carried out using a recovery roll.

The self-supported electrically conductive composite film obtained in step 6) or the electrically conductive composite prepreg obtained in step 5) can be directly used for preparing a laminated composite structure.

The self-supported electrically conductive composite film may be in the form of a film, a ribbon or a sheet, which is continuous or of finite dimensions.

The electrically conductive composite prepreg may be in the form of a prepreg, a ribbon or a sheet, which is continuous or of finite dimensions.

The thickness of the self-supported electrically conductive composite film can range approximately from 10 μm to 150 μm, and preferably approximately from 50 μm to 100 μm.

Below 10 μm, a homogeneous conductivity of the self-supported electrically conductive composite film is not guaranteed, and above 150 μm, the production cost of the self-supported electrically conductive composite film becomes high.

The thickness of the electrically conductive composite prepreg can range approximately from 100 μm to 400 μm, and preferably approximately from 150 μm to 200 μm.

When the suspension of step 1) also comprises metal particles different from the filiform metal nanoparticles, the self-supported film obtained in step 6) or the electrically conductive composite prepreg obtained in step 5) can comprise approximately from 0.5% to 10% by volume, and preferably approximately from 0.2% to 4% by volume, of said metal particles relative to the total volume of the electrically conductive self-supported film or composite prepreg.

In the invention, the expression "electrically conductive self-supported film or composite prepreg" signifies a self-supported film or a composite prepreg which has a surface resistivity strictly less than 10 000 ohms/square, in particular when the electrically conductive particles are carbon nanotubes, graphene, carbon nanofibres, or mixtures thereof, preferably strictly less than 100 ohms/square, in particular when the electrically conductive particles are filiform metal nanoparticles, and more preferably strictly less than 10 ohms/square.

According to one particularly preferred embodiment of the invention, the support used is a non-stick support and the electrically conductive particles are filiform metal nanoparticles such as silver nanowires, so as to obtain a self-supported electrically conductive composite film comprising at least one thermoplastic polymer resin and filiform metal nanoparticles such as silver nanowires.

The self-supported electrically conductive composite film and the electrically conductive composite prepreg obtained according to the process of the invention preferably do not comprise pigment and/or dye. This is because the pigments and/or dyes generally used can impair their mechanical properties.

The self-supported film (respectively the prepreg) obtained according to the process of the invention is preferably in the form of a single homogeneous layer. In other words, the process in accordance with the first subject of the invention preferably does not comprise a step or steps of applying one or more layers (e.g. polymer layer or composite layer) to one of the faces of said self-supported film (respectively of said prepreg).

A second subject of the invention is a self-supported electrically conductive composite film obtained according to the process in accordance with the first subject, characterized in that it comprises at least one thermoplastic polymer resin and approximately from 1% to 10% by volume, relative to the total volume of the self-supported electrically conductive composite film, of electrically conductive particles chosen from:

a) graphene, carbon nanotubes, carbon nanofibres, and mixtures thereof; and b) filiform metal nanoparticles.

The thermoplastic polymer resin and the electrically conductive particles are as defined in the first subject of the invention.

A third subject of the invention is an electrically conductive composite prepreg obtained according to the process in accordance with the first subject, characterized in that it comprises at least one thermoplastic polymer resin, approximately from 10% to 70% by volume of fibres, and approximately from 1% to 10% by volume, relative to the total volume of the electrically conductive composite prepreg, of electrically conductive particles chosen from:

a) graphene, carbon nanotubes, carbon nanofibres, and mixtures thereof; and b) filiform metal nanoparticles.

The thermoplastic polymer resin, the electrically conductive particles and the fibres are as defined in the first subject of the invention.

A fourth subject of the invention is a process for manufacturing an electrically conductive laminated composite structure comprising at least one thermoplastic polymer resin, fibres, and electrically conductive particles chosen from:

a) graphene, carbon nanotubes, carbon nanofibres, and mixtures thereof; and b) filiform metal nanoparticles, said process being characterized in that it comprises one of the following two steps:

i-1) a step of preparing a successive stack of at least one self-supported electrically conductive composite film in accordance with the second subject of the invention and of at least one layer of fibres, or i-2) a step of preparing a stack of at least two electrically conductive composite prepregs, which are identical or different, in accordance with the third subject of the invention, and a thermoforming step ii).

The thermoplastic polymer resin and the electrically conductive particles are as defined in the first subject of the invention.

The at least two electrically conductive composite prepregs are preferably identical.

The self-supported electrically conductive composite film of step i-1) is preferably prepared according to the process in accordance with the first subject of the invention.

The electrically conductive composite prepregs of step i-2) are preferably prepared according to the process in accordance with the first subject of the invention.

The thermoforming step ii) is conventionally carried out at a temperature greater than or equal to the melting point of the thermoplastic polymer resin when said resin is in semi-crystalline form or greater than or equal to its glass transition temperature when said resin is in amorphous form.

This is because, when the thermoplastic polymer resin is in amorphous form (e.g. PEI, PI) and it is heated at a temperature greater than or equal to its glass transition temperature, it is in a rubbery state, and it then becomes easy to give it a new shape.

On the other hand, in the case of the use of a thermoplastic polymer resin in semi-crystalline form (e.g. PPS, PAEK, PA), a temperature greater than or equal to its melting point is required to carry out step ii).

When the two electrically conductive composite prepregs differ by virtue of the type of thermoplastic polymer resin used, step ii) is carried out at a temperature greater than or equal to the highest temperature of the melting points and/or glass transition temperatures of the various thermoplastic polymer resins used.

The thermoplastic polymer resin provides the cohesion between the fibres so as to distribute the mechanical stresses. The fibres perform the function of mechanical strength against loads. The arrangement of the fibres, and the orientation thereof, make it possible to reinforce the mechanical properties of the structure.

In order to obtain good elastic mechanical properties, there must be neither slipping nor separation between the various phases of the structure.

The fibres are as defined in the first subject of the present invention.

In one preferred embodiment, the fibres of step i-1) are in the form of a fibre fabric, a unidirectional alignment of fibres or a fibre mat.

During the stacking of step i-1), the layers of fibres are preferably oriented in different directions, for example according to the following successive orientations: 0°, 45°, 90°, −45°, 0°, 45°, 90°, −45°, etc.

During the stacking of step i-2), the electrically conductive composite prepregs are preferably oriented in different directions, for example according to the following successive orientations: 0°, 45°, 90°, −45°, 0°, 45°, 90°, −45°, etc.

Step ii) can be carried out at a temperature ranging approximately from 200° C. to 400° C.

This step ii) can be carried out by heating the stack under pressure in a preform in order to give the final shape of the laminated composite structure or by means of a conventional heated plate press.

Step ii) can last approximately from 10 min to 1 hour, and preferably approximately from 15 min to 30 min.

Step ii) can be carried out at a pressure ranging approximately from 0.1 MPa to 2 MPa, and preferably ranging approximately from 0.3 MPa to 1.8 MPa.

The process in accordance with the present invention, and in particular the thermoforming step ii), does not degrade the electrical properties of the electrically conductive composite film or prepreg used in step i-1) or i-2). The pressure exerted during step ii) makes it possible to incorporate the electrically conductive particles into the fibres in a homogeneous manner.

The laminated composite structure may comprise from 2 to 128 plies, and preferably from 4 to 64 plies.

The laminated composite structure can have a density ranging approximately from 1.58 to 2, and preferably ranging approximately from 1.65 to 1.75.

In the invention, the expression "electrically conductive laminated composite structure" signifies a structure having a transverse or volume conductivity of greater than or equal to 0.1 S/m, preferably greater than or equal to 10 S/m, and more preferably greater than or equal to 100 S/m.

A fifth subject of the invention is a process for manufacturing an electrically conductive laminated composite structure comprising at least one thermoplastic polymer resin, fibres and electrically conductive particles chosen from:

a) graphene, carbon nanotubes, carbon nanofibres, and mixtures thereof; and b) filiform metal nanoparticles, said process being characterized in that it comprises at least the following steps:

A) a step of preparing at least one unitary stack, comprising a first self-supported electrically conductive composite film in accordance with the second subject of the invention, a layer of fibres, and optionally a second self-supported electrically conductive composite film in accordance with the second subject of the invention, B) a thermoforming step, so as to form a first electrically conductive composite preimpregnated film, C) the repetition of steps A) and B), so as to form at least a second electrically conductive composite preimpregnated film, D) a step of preparing a stack of several electrically conductive composite preimpregnated films, which are identical or different, as obtained in steps B) and C), and E) a thermoforming step.

The thermoplastic polymer resin and the electrically conductive particles are as defined in the first subject of the invention.

The first self-supported electrically conductive composite film of step A) is preferably prepared according to the process in accordance with the first subject of the invention.

The second self-supported electrically conductive composite film of step A) is preferably prepared according to the process in accordance with the first subject of the invention.

The thermoplastic polymer resin provides the cohesion between the fibres so as to distribute the mechanical stresses. The fibres perform the function of mechanical strength against loads. The arrangement of the fibres and their orientation make it possible to reinforce the mechanical properties of the structure.

In order to obtain good elastic mechanical properties, there must be neither slipping nor separation between the various phases of the structure.

The fibres are as defined in the first subject of the present invention.

In one preferred embodiment, the fibres of step A) and/or C) are in the form of a fibre fabric, a unidirectional alignment of fibres or a fibre mat.

Said first and second self-supported electrically conductive composite films used during step A) may be identical or different.

They are preferably identical.

When said first and second self-supported electrically conductive composite films differ by virtue of the type of thermoplastic polymer resin used, step B) is carried out at a temperature greater than or equal to the highest temperature of the melting points and/or glass transition temperatures of the various thermoplastic polymer resins used.

The thermoforming step B) can be carried out at a temperature ranging approximately from 200° C. to 400° C.

This step B) can be carried out using a roll or a heated belt press.

Step B) can be carried out at a pressure ranging approximately from 0.1 MPa to 2 MPa, and preferably ranging approximately from 0.3 MPa to 1.8 MPa.

The thermoforming step B) does not degrade the electrical properties of the self-supported electrically conductive composite film used in step A).

Step B) can last approximately from 10 min to 1 hour, and preferably approximately from 15 min to 30 min.

The electrically conductive composite preimpregnated film obtained in step B) or C) may be in the form of a film, a ribbon or a sheet, which is continuous or of finite dimensions.

During the stacking of step D), the electrically conductive composite preimpregnated films can be oriented in different directions, for example according to the following successive orientations: 0°, 45°, 90°, −45°, 0°, 45°, 90°, −45°, etc.

The electrically conductive composite preimpregnated films are preferably identical.

When the electrically conductive composite preimpregnated films differ by virtue of the type of thermoplastic polymer resin used, step E) is carried out at a temperature greater than or equal to the highest temperature of the melting points and/or glass transition temperatures of the various thermoplastic polymer resins used.

The thermoforming step E) can be carried out at a temperature ranging approximately from 200° C. to 400° C.

Step E) can be carried out at a pressure ranging approximately from 0.1 MPa to 2 MPa, and preferably ranging approximately from 0.3 MPa to 1.8 MPa.

The thermoforming step E) does not degrade the electrical properties of the electrically conductive composite preimpregnated films prepared in steps B) and C).

Step E) can last approximately from 10 min to 1 hour, and preferably approximately from 15 to 30 min.

This step E) can be carried out by heating the stack under pressure in a preform in order to give the final shape of the laminated composite structure or by means of a conventional heated plate press.

In one particular embodiment, the electrically conductive composite preimpregnated films are continuous ribbons which are heated and pressed simultaneously while successively rolling these ribbons around a preform.

The process of the invention may also comprise, after step E), a step F) of consolidation of the laminated composite structure in an autoclave (i.e. oven under pressure).

This consolidation step F) corresponds to heating of the laminated composite structure at a temperature above the melting point or glass transition temperature of the thermoplastic polymer resin and a given pressure. This step makes it possible to decrease the degree of porosity contained in the composite structure.

The laminated composite structure may comprise from 2 to 128 plies, and preferably from 4 to 64 plies.

The laminated composite structure can have a density ranging approximately from 1.58 to 2, and preferably ranging approximately from 1.65 to 1.75.

A sixth subject of the invention is an electrically conductive laminated composite structure obtained according to the process in accordance with the fourth subject of the invention or obtained according to the process in accordance with the fifth subject of the invention, characterized in that it comprises any one of the following stacks:
- a successive stack (first type of stack) of at least one self-supported electrically conductive composite film in accordance with the second subject of the invention, and of at least one layer of fibres, or
- a stack (second type of stack) of at least two electrically conductive composite prepregs, which are identical or different, in accordance with the third subject of the invention, or
- a stack (third type of stack) of at least two unitary stacks, which are identical or different, comprising a first self-supported electrically conductive composite film in accordance with the second subject of the invention, a layer of fibres, and optionally a second self-supported electrically conductive composite film in accordance with the second subject of the invention.

The self-supported electrically conductive composite film of the first type of stack and the first and second self-supported electrically conductive composite films of the third type of stack are preferably prepared according to the process in accordance with the first subject of the invention.

The electrically conductive composite prepregs of the second type of stack are preferably prepared according to the process in accordance with the first subject of the invention.

A seventh subject of the invention is the use of an electrically conductive composite film as obtained in the process in accordance with the first subject of the invention or in accordance with the second subject of the invention, for conferring electrical conductivity on a composite structure or on a composite prepreg, or for improving their electrical conductivity.

An eighth subject of the invention is the use of an electrically conductive laminated composite structure as obtained in the process in accordance with the fourth or with the fifth subject of the invention, or in accordance with the sixth subject of the invention, for replacing solid metal structures, in particular in the aeronautical field, or for manufacturing support parts or structures of vehicles (chassis, plates, etc.).

DETAILED DESCRIPTION

The present invention is illustrated by the examples hereinafter, to which this is not however limited.

EXAMPLES

The starting materials used in the examples are listed hereinafter:
- polyether ketone ketone (PEKK) resin, Kepstan 6003, Arkema, powder with a particle size of approximately 20 µm, Arkema,
- polyphenylene sulphide (PPS) resin: Fortron 0205B4, powder with a particle size of approximately 20 µm, Celanese,
- ethanol, purity 99.8%, Sigma Aldrich,
- multiwall carbon nanotubes (GRAPHISTRENGTH MWNTs), Graphistrength C100®, Arkema,
- carbon black, Sigma Aldrich, <500 nm,
- carbon fibre fabrics, Hexforce G0904 D1070 TCT, 193 g/m², plain weaves from Hexcel,
- non-stick support: Upilex® polyimide sheet, or metal sheet made non-stick using a demoulding agent, Cirex Si041WB® from Sicomin.

Unless otherwise indicated, all these starting materials were used as received from the manufacturers.

The ultrasound instrument used in the examples hereinafter is sold under the trade name Vibracell 65115 by Fisherbioblock.

Example 1

Preparation of an Electrically Conductive Composite Film in Accordance with the Invention and Prepared According to the Process in Accordance with the Invention A suspension of 2861 ml comprising 207.1 g of silver nanowires and ethanol was prepared. The silver nanowires were prepared beforehand according to a solution growth process from silver nitrate ($AgNO_3$) and polyvinylpyrrolidone (PVP) as described by Y. G. Sun et al., "*Crystalline silver nanowires by soft solution processing*", Nano Letters, 2002. 2(2): p. 165-168, with a PVP/$AgNO_3$ ratio of 1.53.

The silver nanowires obtained have a length ranging approximately from 10 to 100 μm, and a width ranging approximately from 120 to 400 nm.

The silver nanowire suspension was mixed with 1000 g of Kepstan® 6003 thermoplastic polymer resin using mechanical stirring (propeller at 100 revolutions per minute) and ultrasound at a frequency of 50 kHz and a power of 25 W per pulse of 5 seconds. A homogeneous suspension comprising ethanol, the PEKK resin and the silver nanowires was thus obtained. The suspension had a viscosity of approximately 3 Pa·s.

The suspension was introduced into a container comprising an injection nozzle in its lower part, and was applied to the Upilex® or Cirex Si041WB® non-stick support using said injection nozzle, and a scraper located at the outlet of said nozzle.

In order to form a continuous layer of suspension, a roll which makes it possible to cause the non-stick support to continuously file past the injection nozzle and under the scraper, was used. The roll speed was approximately 2 cm/second.

The layer of suspension was then dried at a temperature of approximately 150° C. and heat-treated in a conventional oven at a temperature of approximately 350° C. for approximately 5 minutes so as to form an electrically conductive composite film deposited on said non-stick support. Said electrically conductive composite film was then detached from the non-stick support so as to form a self-supported electrically conductive composite film comprising PEKK and 2.5% by volume of silver nanowires. It had a resistivity of 0.6 ohm/square.

Figure 1:
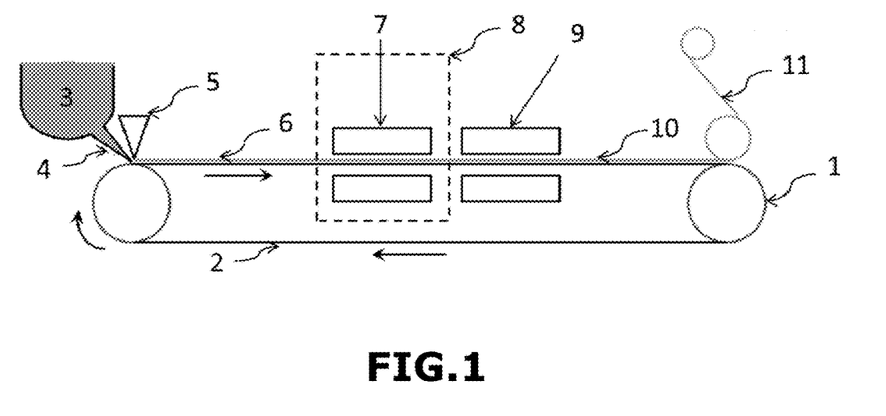
FIG. 1 is a diagrammatic representation of the device used to carry out the process in accordance with one embodiment

FIG. 1 is a diagrammatic representation of the device used to carry out the process in accordance with the first subject of the invention.

Said device comprises a roll 1 which makes it possible to cause a non-stick or fibrous support 2 to continuously file past. A homogeneous suspension comprising at least one thermoplastic polymer resin and electrically conductive particles is introduced into a container 3 comprising an injection nozzle 4 in its lower part, and is maintained under mechanical stirring. This suspension is applied to the non-stick support 2 by means of said nozzle 4, and of a scraper 5 located at the outlet of the nozzle 4 so as to form a layer of suspension 6 deposited on the non-stick support or impregnating the fibrous support. This layer is dried in a dryer 7. The vapours can be recovered by means of a system 8 of ventilation and condensation for the recovery of the solvent. The dried layer of suspension is then heat-treated in an oven 9 at a temperature greater than or equal to the melting point of the thermoplastic polymer resin so as to form an electrically conductive composite film or prepreg 10. The device may also comprise a recovery roll 11.

Figure 2:
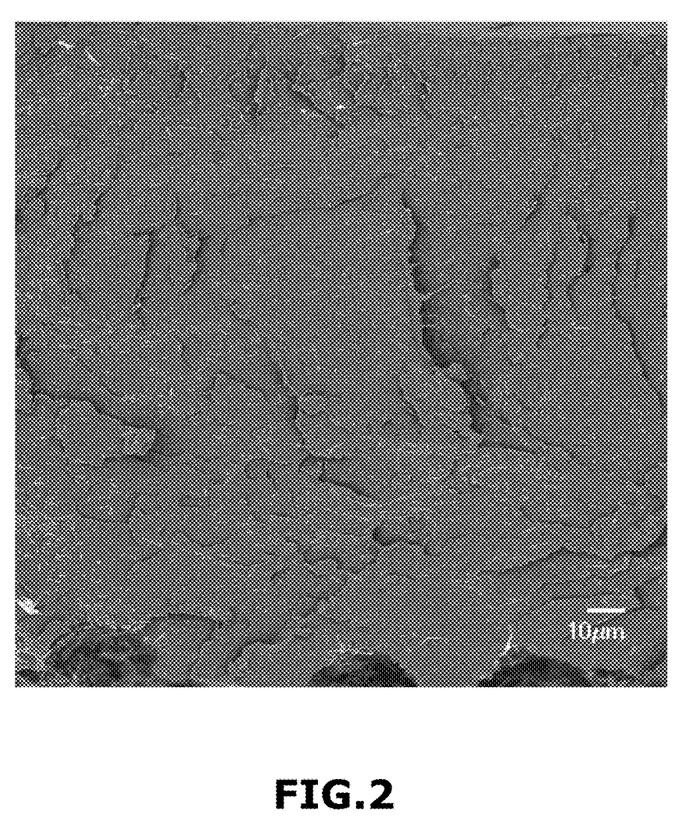
FIG. 2 is an image of the electrically conductive composite film of example 1 in accordance with one embodiment and FIG. 3 is an image showing the laminated composite structure (4-ply stack) of example 2 in accordance with one embodiment.

FIG. 2 shows the electrically conductive composite film in accordance with the invention and as obtained in this example, by scanning electron microscopy (FEG-SEM) performed with a microscope equipped with a field emission gun, sold under the trade name Jeol JSM 6700F by the company Jeol.

Example 2

Preparation of an Electrically Conductive Laminated Composite Structure in Accordance with the Invention and Prepared According to the Process in Accordance with the Invention A laminated composite structure was manufactured by manual preparation of a successive stack of an electrically conductive composite film as obtained in Example 1, of a layer of a fibre fabric, of an electrically conductive composite film as obtained in Example 1, and of a layer of fibres (i.e. 2-ply stack: [film of PEKK-silver nanowires/layer of fibre fabric]$_2$), and by thermoforming of the stack at a temperature of 350° C. and a pressure of 0.5 MPa for 15 min, using a press sold under the trade name Carver 4128CE by the company Carver.

During the 2-ply stacking, the layers of fibres are oriented according to the successive orientations 0° and 45°.

The laminated composite structure obtained had a density of 1.65 and a conductivity of 200 S/m.

A laminated composite structure was manufactured by manual preparation of a 4-ply stack: [film of PEKK-silver nanowires/layer of fibre fabric]$_4$, and by thermoforming of the stack at a temperature of 350° C. and a pressure of 0.5 MPa for 15 min using the same press as that described above.

During the 4-ply stacking, the layers of fibres are oriented according to the successive orientations 0°, 45°, 0° and 45°.

The laminated composite structure obtained had a density of 1.805 and a conductivity of 350 S/m.

Figure 3:
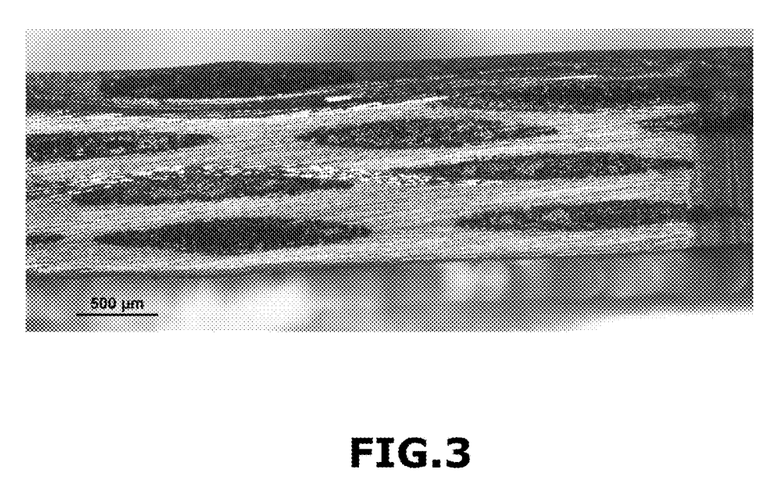

FIG. 3 shows the laminated composite structure (4-ply stack) in accordance with the invention and as obtained in this example, by scanning electron microscopy (FEG-SEM) performed with a microscope equipped with a field emission gun, sold under the trade name Jeol JSM 6700F by the company Jeol.

Example 3

Preparation of an Electrically Conductive Composite Film in Accordance with the Invention and Prepared According to the Process in Accordance with the Invention A suspension of 5800 ml comprising 28.35 g of carbon nanotubes and ethanol was prepared by means of ultrasound at a frequency of 20 kHz and a power of 500 W per pulse of 5 seconds for 2 min.

The carbon nanotube suspension was mixed with 826 g of Kepstan® 6003 thermoplastic polymer resin using mechanical stirring (propeller at 100 revolutions per minute) and ultrasound at a frequency of 20 kHz and a power of 500 W per pulse of 5 seconds. A homogeneous suspension comprising ethanol, the PEKK resin and the carbon nanotubes was thus obtained. The suspension had a viscosity of approximately 5 Pa·s.

The suspension was introduced into a container comprising an injection nozzle in its lower part, and was applied to the non-stick support by means of said injection nozzle, and a scraper located at the outlet of said nozzle.

In order to form a continuous layer of suspension, a roll which makes it possible to cause the non-stick support to continuously file past the injection nozzle and under the scraper was used. The roll speed was approximately 2 cm/second.

The layer of suspension was then dried at a temperature of approximately 150° C. and heat-treated in a conventional oven at a temperature of approximately 350° C. for approximately 5 minutes so as to form an electrically conductive composite film deposited on said non-stick support.

Said electrically conductive composite film was then detached from the non-stick support so as to form a self-supported electrically conductive composite film comprising PEKK and 2% by volume of carbon nanotubes. It had a resistivity of 6000 ohm/square.

Example 4

Preparation of an Electrically Conductive Laminated Composite Structure in Accordance with the Invention and Prepared According to the Process in Accordance with the Invention A laminated composite structure was manufactured by manual preparation of a successive stack of an electrically conductive composite film as obtained in Example 3, of a layer of a fibre fabric, of an electrically conductive composite film as obtained in Example 3, and of a layer of fibres (i.e. 2-ply stack: [film of PEKK-carbon nanotubes/layer of fibre fabric]$_2$), and by thermoforming of the stack at a temperature of 350° C. and a pressure of 0.5 MPa, using the same press as that described in Example 2.

During the 2-ply stacking, the layers of fibres are oriented according to the successive orientations 0° and 45°.

The laminated composite structure obtained had a density of 1.662 and a conductivity of 0.1 S/m.

Comparative Example 5

Preparation of an Electrically Conductive Composite Film not in Accordance with the Invention A self-supported PEKK film was prepared according to the process as described in Example 1 using a suspension of 2500 ml comprising 1000 g of Kepstan® 6003 thermoplastic polymer resin and ethanol. The suspension had a viscosity of approximately 3 Pa·s. The layer of suspension was applied to the non-stick support as described in Example 1, dried at a temperature of approximately 150° C., and heat-treated in a conventional oven at a temperature of approximately 350° C. for approximately 5 minutes.

This film is not part of the invention since it does not comprise electrically conductive particles chosen from: a) graphene, carbon nanotubes, carbon nanofibres, and mixtures thereof; and b) filiform metal nanoparticles. It had a resistivity >1 000 000 ohm/square.

This self-supported film not in accordance with the invention could also be obtained by forming under a hot press (i.e. melt-forming) at a temperature of 350° C. and at a pressure of 0.5 MPa and using the same press as that described in Example 2.

Comparative Example 6

Preparation of an Electrically Conductive Laminated Composite Structure Not in Accordance with the Invention A laminated composite structure was manufactured by manual preparation of a successive stack of a film as obtained in Comparative Example 5, of a layer of a fibre fabric, of a film as obtained in Comparative Example 5, and of a layer of fibres (i.e. 2-ply stack: [film of PEKK/layer of fibre fabric]$_2$), and by thermoforming of the stack at a temperature of 350° C. and a pressure of 0.5 MPa, using the same press as that described in Example 2.

During the 2-ply stacking, the layers of fibres are oriented according to the successive orientations 0° and 45°.

The laminated composite structure obtained, not in accordance with the invention, had a density of 1.655 and a conductivity of $10^{-12}$ S/m.

Thus, this laminated composite structure, not part of the invention, has an insufficient electrical conductivity and cannot therefore replace a metal structure.

Comparative Example 7

Preparation of an Electrically Conductive Composite Film Not in Accordance with the Invention A self-supported film comprising PEKK (Kepstan® 6003 thermoplastic polymer resin) and 15% by volume of carbon black was prepared by forming under a hot press (i.e. melt-forming) using the press as described in Example 2, at a temperature of 350° C. and at a pressure of 10 MPa. It had a resistivity of 200 ohm/square.

This film is not part of the invention since it does not comprise electrically conductive particles chosen from: a) graphene, carbon nanotubes, carbon nanofibres, and mixtures thereof; and b) filiform metal nanoparticles.

This same self-supported film not in accordance with the invention could not be prepared according to a process similar to that as described in Example 1, and in the invention (i.e. by preparation of a suspension, then of a layer of suspension, drying and heat-treatment). This is because the suspension comprised too great an amount of carbon black to be able to form the layer of suspension and then said film, and if the amount of carbon black is less than 15% by volume, the conductivity of the film is not sufficient.

Comparative Example 8

Preparation of an Electrically Conductive Laminated Composite Structure Not in Accordance with the Invention A laminated composite structure was manufactured by manual preparation of a successive stack of a film as obtained in Comparative Example 7, of a layer of fibre fabric, of a film as obtained in Comparative Example 7, and of a layer of fibres (i.e. 2-ply stack: [film of PEKK-carbon black/layer of fibre fabric]$_2$), and by thermoforming of the stack at a temperature of 350° C. and a pressure of 18 MPa, using the same press as that described in Example 2.

During the 2-ply stacking, the layers of fibres are oriented according to the successive orientations 0° and 45°.

The laminated composite structure obtained, not in accordance with the invention, had a density of 1.703 and a conductivity of 1 S/m. This structure has a sufficient electrical conductivity. However, it proved to be very weak and brittle, and does not therefore have mechanical properties suitable for being able to be used.

In conclusion, by virtue of the electrically conductive film in accordance with the invention comprising at least one thermoplastic resin and electrically conductive particles chosen from a) graphene, carbon nanotubes, carbon nanofibres, and mixtures thereof; and b) metal nanoparticles, a laminated composite structure with both good electrical properties and good mechanical properties can be obtained.

Example 9

Preparation of an Electrically Conductive Composite Film in Accordance with the Invention and Prepared According to the Process in Accordance with the Invention A suspension of 2800 ml comprising 250 g of silver nanowires in ethanol was prepared as in Example 1.

The suspension of silver nanowires was mixed with 1000 g of Fortron® 0205B4 thermoplastic polymer resin by means of mechanical stirring (propeller at 100 revolutions per minute) and ultrasound at a frequency of 50 kHz and a power of 25 W per pulse of 5 seconds. A homogeneous suspension comprising ethanol, the PPS resin, and the silver nanowires was thus obtained. The suspension had a viscosity of approximately 2 Pa·s.

The suspension was applied to the Upilex or Cirex Si041WB non-stick support as in Example 1.

The layer of suspension was then dried at a temperature of approximately 150° C. and heat-treated in a conventional oven at a temperature of approximately 310° C. for approximately 5 minutes so as to form an electrically conductive composite film deposited on said non-stick support. Said electrically conductive composite film was then detached from the non-stick support so as to form a self-supported electrically conductive composite film comprising PPS and 3% by volume of silver nanowires. It had a resistivity of 0.9 ohm/square.

Example 10

Preparation of an Electrically Conductive Laminated Composite Structure in Accordance with the Invention and Prepared According to the Process in Accordance with the Invention A laminated composite structure was manufactured by manual preparation of a successive stack of an electrically conductive composite film as obtained in Example 9, of a layer of a fibre fabric, of an electrically conductive composite film as obtained in Example 9, and of a layer of fibres (i.e. 2-ply stack: [film of PPS-silver nanowires/layer of fibre fabric]$_2$), and by thermoforming of the stack at a temperature of 310° C. and a pressure of 0.5 MPa for 15 min, using the same press as that described in Example 2.

During the 2-ply stacking, the layers of fibres are oriented according to the successive orientations 0° and 45°.

The laminated composite structure obtained had a density of 1.68 and a conductivity of 30 S/m.

The invention claimed is:

1. Process for preparing an electrically conductive composite film comprising at least one thermoplastic polymer resin and electrically conductive particles chosen from:
   a) graphene, carbon nanotubes, carbon nanofibres, and mixtures thereof; and
   b) filiform metal nanoparticles, said electrically conductive composite film impregnating fibres, wherein said process comprises at least the following steps:
   1) a step of preparing a suspension comprising a solvent and electrically conductive particles chosen from:
      a) graphene, carbon nanotubes, carbon nanofibres, and mixtures thereof; and
      b) filiform metal nanoparticles,
   said suspension comprising from 0.06% to 0.5% by volume of said electrically conductive particles relative to the total volume of the suspension,
   2) a step of mixing a powder of thermoplastic polymer resin, having a particle size of less than or equal to 50 μm, with the suspension prepared in the preceding step so as to obtain a homogeneous suspension, said homogeneous suspension comprising from 7% to 20% by volume of said thermoplastic polymer resin relative to the total volume of the suspension,
   3) a step of depositing the homogeneous suspension of the preceding step on a fibrous support,
   4) a drying step, and
   5) a step of heat treatment at a temperature greater than or equal to the melting point of the thermoplastic polymer resin when said resin is in semi-crystalline form or greater than or equal to its glass transition temperature when said resin is in amorphous form, in order to obtain an electrically conductive composite film impregnating said fibrous support,
   wherein
   said electrically conductive composite film is a prepreg comprising at least one thermoplastic polymer resin, from 1% to 10% by volume of electrically conductive particles, and from 10% to 70% by volume of fibres, relative to the total volume of the electrically conductive composite prepreg, and
   wherein the electrically conductive particles have an aspect ratio greater than or equal to 50.

2. Process according to claim 1, wherein the solvent of step 1) is chosen from oxygen-bearing solvents.

3. Process according to claim 1, wherein the electrically conductive particles are filiform metal nanoparticles.

4. Process according to claim 1, wherein the thermoplastic resin of step 2) is chosen from polyaryl ether ketones (PAEKs) such as polyether ether ketones (PEEKs), polyether ketone ketones (PEKKs), polyether ether ketone ketones (PEEKKs), polyether ketones (PEKs), or polyether ketone ether ketone ketones (PEKEKKs).

5. Process according to claim 1, wherein the suspension prepared in step 2) has a viscosity ranging from 1 Pa·s to 33 Pa·s.

6. Process according to claim 1, wherein step 5) is carried out at a temperature ranging from 200° C. to 400° C.

7. Process according to claim 1, wherein step 3) is carried out according to the following sub-steps:
   3a) a step of introducing the homogeneous suspension of step 2) into a container comprising an injection nozzle in its lower part, and maintaining the suspension under mechanical stirring,
   3b) a step of applying the suspension to a fibrous support, by means of said injection nozzle and of a scraper located at the outlet of the nozzle.

8. Process according to claim 1, wherein step 3) is carried out according to the following sub-steps:
   3a') a step of introducing the homogeneous suspension of step 2) into a container and maintaining it under mechanical stirring, 3b') a step of immersing a fibrous support in the suspension.

9. Process according to claim 1, wherein in the suspension of step 2), the ratio of the weight of solvent to the weight of total solids (i.e. weight of thermoplastic polymer resin+weight of electrically conductive particles) ranges from 0.5 to 8.

10. Process for preparing an electrically conductive composite film comprising at least one thermoplastic polymer resin and electrically conductive particles chosen from:
   a) graphene, carbon nanotubes, carbon nanofibres, and mixtures thereof; and
   b) filiform metal nanoparticles, said electrically conductive composite film impregnating fibres, wherein said process comprises at least the following steps:
   1) a step of preparing a suspension comprising a solvent and electrically conductive particles chosen from:
   a) graphene, carbon nanotubes, carbon nanofibres, and mixtures thereof; and
   b) filiform metal nanoparticles, said suspension comprising from 0.06% to 0.5% by volume of said electrically conductive particles relative to the total volume of the suspension,
   2) a step of mixing a powder of thermoplastic polymer resin, having a particle size of less than or equal to 50 µm, with the suspension prepared in the preceding step so as to obtain a homogeneous suspension, said homogeneous suspension comprising from 7% to 20% by volume of said thermoplastic polymer resin relative to the total volume of the suspension,
   3) a step of depositing the homogeneous suspension of the preceding step on a fibrous support,
   4) a drying step, and
   5) a step of heat treatment at a temperature greater than or equal to the melting point of the thermoplastic polymer resin when said resin is in semi-crystalline form or greater than or equal to its glass transition temperature when said resin is in amorphous form, in order to obtain an electrically conductive composite film impregnating said fibrous support,
   wherein said electrically conductive composite film is a prepreg comprising at least one thermoplastic polymer resin, from 1% to 10% by volume of electrically conductive particles, and from 10% to 70% by volume of fibres, relative to the total volume of the electrically conductive composite prepreg, and
   wherein in the suspension of step 2), the ratio of the weight of solvent to the weight of total solids (i.e. weight of thermoplastic polymer resin+weight of electrically conductive particles) ranges from 0.5 to 8.

11. Process for preparing an electrically conductive composite film comprising at least one thermoplastic polymer resin and electrically conductive particles chosen from:
   a) graphene, carbon nanotubes, carbon nanofibres, and mixtures thereof; and
   b) filiform metal nanoparticles, said electrically conductive composite film impregnating fibres, wherein said process comprises at least the following steps:
   1) a step of preparing a suspension comprising a solvent and electrically conductive particles chosen from:
   a) graphene, carbon nanotubes, carbon nanofibres, and mixtures thereof; and
   b) filiform metal nanoparticles, said suspension comprising from 0.06% to 0.5% by volume of said electrically conductive particles relative to the total volume of the suspension,
   2) a step of mixing a powder of thermoplastic polymer resin, having a particle size of less than or equal to 50 µm, with the suspension prepared in the preceding step so as to obtain a homogeneous suspension, said homogeneous suspension comprising from 7% to 20% by volume of said thermoplastic polymer resin relative to the total volume of the suspension,
   3) a step of depositing the homogeneous suspension of the preceding step on a fibrous support,
   4) a drying step, and
   5) a step of heat treatment at a temperature greater than or equal to the melting point of the thermoplastic polymer resin when said resin is in semi-crystalline form or greater than or equal to its glass transition temperature when said resin is in amorphous form, in order to obtain an electrically conductive composite film impregnating said fibrous support,
   wherein said electrically conductive composite film is a prepreg comprising at least one thermoplastic polymer resin, from 1% to 10% by volume of electrically conductive particles, and from 10% to 70% by volume of fibres, relative to the total volume of the electrically conductive composite prepreg, and wherein step 3) is carried out according to the following sub-steps:
   3a') a step of introducing the homogeneous suspension of step 2) into a container and maintaining it under mechanical stirring, and
   3b') a step of immersing a fibrous support in the suspension.

* * * * *